(12) United States Patent
Anderson et al.

(10) Patent No.: US 7,856,824 B2
(45) Date of Patent: Dec. 28, 2010

(54) COOLING SYSTEMS FOR USE ON AIRCRAFT

(75) Inventors: Morris G. Anderson, Mesa, AZ (US); William E. Alford, Mesa, AZ (US); Michael L. Trego, Mesa, AZ (US); Ron Haugland, Scottsdale, AZ (US); David K. Winstanley, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 788 days.

(21) Appl. No.: 11/767,993

(22) Filed: Jun. 25, 2007

(65) Prior Publication Data

US 2008/0314047 A1 Dec. 25, 2008

(51) Int. Cl.
*F02C 1/00* (2006.01)

(52) U.S. Cl. .................. 60/728; 60/226.1; 60/785

(58) Field of Classification Search ............ 60/226.1, 60/266, 728, 262, 785, 795
See application file for complete search history.

(56) References Cited

U.S. PATENT DOCUMENTS

| | | | |
|---|---|---|---|
| 3,557,557 A * | 1/1971 | Prachar | 60/257 |
| 3,981,466 A | 9/1976 | Shah | |
| 4,254,618 A | 3/1981 | Elovic | |
| 4,608,819 A * | 9/1986 | Colman et al. | 60/39.83 |
| 5,123,242 A | 6/1992 | Miller | |
| 5,203,163 A | 4/1993 | Parsons | |
| 5,511,374 A | 4/1996 | Glickstein et al. | |
| 5,704,218 A | 1/1998 | Christians et al. | |
| 5,899,085 A | 5/1999 | Williams | |
| 5,911,388 A | 6/1999 | Severson et al. | |
| 6,134,880 A | 10/2000 | Yoshinaka | |
| 6,442,944 B1 | 9/2002 | Skur, III | |
| 6,460,353 B2 | 10/2002 | Udobot et al. | |
| 6,634,596 B2 | 10/2003 | Albero et al. | |
| 6,817,575 B1 | 11/2004 | Munoz et al. | |
| 7,716,913 B2 * | 5/2010 | Rolt | 60/266 |
| 2005/0268612 A1 * | 12/2005 | Rolt | 60/728 |
| 2007/0130912 A1 * | 6/2007 | Kraft et al. | 60/226.1 |
| 2008/0230651 A1 * | 9/2008 | Porte | 244/118.5 |

* cited by examiner

*Primary Examiner*—Michael Cuff
*Assistant Examiner*—Phutthiwat Wongwian
(74) *Attorney, Agent, or Firm*—Ingrassia Fisher & Lorenz PC

(57) ABSTRACT

Cooling systems for an aircraft are provided. In an embodiment, a system includes an engine nacelle, an engine, a bypass duct, and a heat exchanger. The engine nacelle includes an airflow inlet. The engine is housed in the engine nacelle in flow communication with the airflow inlet. The bypass duct extends between the engine nacelle and the engine is in flow communication with the airflow inlet. The bypass duct includes an outer wall and an opening formed therein. The heat exchanger is integrated with the engine and is disposed over the opening of the bypass duct outer wall between the bypass duct outer wall and the engine nacelle.

20 Claims, 1 Drawing Sheet

COOLING SYSTEMS FOR USE ON AIRCRAFT

STATEMENT REGARDING FEDERALLY SPONSORED RESEARCH OR DEVELOPMENT

This inventive subject matter was made with Government support under F33615-03-D-2355-0006 awarded by the United States Air Force. The Government has certain rights in this inventive subject matter.

TECHNICAL FIELD

The inventive subject matter relates to cooling systems and, more particularly, to cooling systems for use on aircraft.

BACKGROUND

A gas turbine engine may be used to power various types of vehicles and systems. A particular type of gas turbine engine that may be used to power aircraft is a turbofan gas turbine engine. A turbofan gas turbine engine may include, for example, a fan section, a compressor section, a combustor section, a turbine section, and an exhaust section. The fan section is positioned at the front, or "inlet" section of the engine, and includes a fan that induces air from the surrounding environment into the engine, and compresses a fraction of this air into the compressor section. The remaining fraction of air induced into the fan section is compressed into and through a bypass duct, and expanded out the exhaust section to produce thrust.

The compressor section further raises the pressure of the air it receives from the fan section to a relatively high level. In a multi-spool engine, the compressor section may include two or more compressors, such as, for example, a high pressure compressor and a low pressure compressor. The compressed air from the compressor section then enters the combustor section, where fuel nozzles inject a steady stream of fuel into a plenum formed by liner walls and a dome. The injected fuel is ignited in the combustor, which significantly increases the energy of the compressed air. The high-energy, compressed air from the combustor section then flows into and through the turbine section, causing rotationally mounted turbine blades to rotate and generate energy. The air exiting the turbine section is exhausted from the engine via the exhaust section, and the energy remaining in the exhaust air aids the thrust generated by the air flowing through the bypass duct.

Gas turbine engines may be configured to divert a portion of the high-energy, compressed air from the compressor section for use in other aircraft systems. For example, some of the diverted air may be used for an aircraft environmental control system (ECS), an aircraft anti ice system, or other system. To ensure that the diverted air can be used for the aircraft systems, it is typically precooled by a heat exchanger or an air conditioning system. Conventionally, the heat exchanger or air conditioning system may be disposed in a section of the aircraft that is not adjacent to the engine. As a result, additional ducting and components are typically used to flow the diverted air to the heat exchanger or air conditioning system. However, the additional ducting and components may add unwanted weight and cost to the aircraft, which may be undesirable as the demand for more economical aircraft continues to increase.

Hence, there is a need for a cooling system that may be implemented into existing aircraft without substantially increasing weight and cost. Moreover, it is desirable to have a cooling system that may be implemented by adding a minimal number of additional components to the aircraft.

BRIEF SUMMARY

The inventive subject matter provides cooling systems for aircraft.

In one embodiment, and by way of example only, a system includes an engine nacelle, an engine, a bypass duct, and a heat exchanger. The engine nacelle includes an airflow inlet. The engine is housed in the engine nacelle in flow communication with the airflow inlet. The bypass duct extends between the engine nacelle and the engine is in flow communication with the airflow inlet. The bypass duct includes an outer wall having an opening formed therein. The heat exchanger is integrated with the engine and is disposed over the opening of the bypass duct outer wall between the bypass duct outer wall and the engine nacelle.

In another embodiment, and by way of example only, the system includes an engine nacelle, an engine, a bypass duct, a heat exchanger, and a bypass flow path valve. The engine nacelle includes an airflow inlet. The engine is housed in the engine nacelle in flow communication with the airflow inlet. The bypass duct extends between the engine nacelle and the engine in flow communication with the airflow inlet and includes an outer wall having an opening formed therein. The heat exchanger is disposed on the bypass duct outer wall in communication with the opening thereof and including a bypass flow path air inlet, an engine air inlet, a first outlet, and a second outlet. The bypass flow path air inlet is in flow communication with the bypass flow path and the first outlet, and the engine air inlet is in flow communication with the engine and the second outlet. The bypass flow path valve is disposed downstream of the bypass flow path air inlet and is configured to selectively open and close to at least partially regulate airflow through the heat exchanger.

In still another embodiment, and by way of example only, a system includes an engine nacelle, an engine, a bypass duct, and a heat exchanger. The engine nacelle includes an airflow inlet. The engine is housed in the engine nacelle in flow communication with the airflow inlet. The bypass duct extends between the engine nacelle and the engine in flow communication with the airflow inlet, and the bypass duct includes an outer wall having an opening formed therein. The heat exchanger is disposed between the bypass duct outer wall and the engine nacelle and has a wall that is integrally formed with the bypass duct outer wall. The heat exchanger is in flow communication with the bypass duct outer wall opening and includes a bypass flow path air inlet, an engine air inlet, a first outlet, and a second outlet. The bypass flow path air inlet provides flow communication between the bypass flow path and the first outlet, and the engine air inlet provides flow communication between the engine and the second outlet.

Other independent features and advantages of the systems will become apparent from the following detailed description, taken in conjunction with the accompanying drawings which illustrate, by way of example, the principles of the inventive subject matter.

DETAILED DESCRIPTION OF A PREFERRED EMBODIMENT

Figure 1:
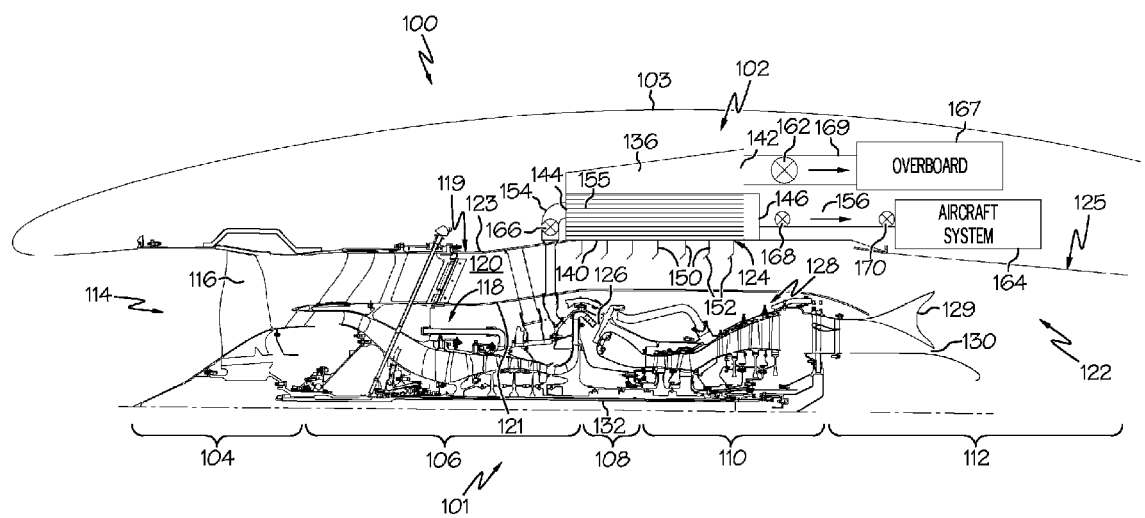
FIG. 1 is a cross-sectional side view of a portion of an aircraft including a cooling system, according to an embodiment.

The following detailed description of the inventive subject matter is merely exemplary in nature and is not intended to limit the inventive subject matter or the application and uses of the inventive subject matter. Furthermore, there is no intention to be bound by any theory presented in the preceding background of the inventive subject matter or the following detailed description of the inventive subject matter.

FIG. 1 is a simplified, cross-sectional view of a portion of an aircraft 100 that includes a cooling system 102, according to an embodiment. The aircraft 100 may include an engine 101 housed in an engine nacelle 103. The engine 101 includes a fan section 104, a compressor section 106, a combustion section 108, a turbine section 110, and an exhaust section 112. The engine nacelle 103 has an airflow inlet 114 that provides air to the fan section 104. The air may be drawn into and compressed through the fan section 104 via a fan 116. Part of the compressed air exhausted from the fan 116 is directed through a bypass duct 119 that has an inner wall 121 and an outer wall 123 that defines a bypass flow path 120 therebetween. The bypass duct 119 extends through the engine nacelle 103, and may be located radially outwardly from the compressor section 106, the combustion section 108, the turbine section 110, and the exhaust section 112. In an embodiment, a portion of the air flowing through the bypass flow path 120 may be exhausted out an opening 124 formed in the outer wall 123 of the bypass duct 119. Another portion of the air may be exhausted into a mixing duct 125 and expelled out of a nozzle exit 122. The remaining fraction of air exhausted from the fan 116 is directed into the compressor section 106.

The compressor section 106 may include series of compressors 118, which raise the pressure and increase the temperature of the air directed into it from the fan 116. For example, the air pressure may have a pressure greater than about 300 psi and a temperature greater than about 535° C. The compressors 118 may direct the compressed air into the combustion section 108. In the combustion section 108, which may include an annular combustor 126, the high pressure air is mixed with fuel and combusted. The combusted air is then directed into the turbine section 110.

The turbine section 110 may include a series of turbines 128, which may be disposed in axial flow series. The combusted air from the combustion section 108 expands through the turbines 128, causing them to rotate. The air is then exhausted through a mixer nozzle 129 and combines with air from the bypass duct 119 that may be in the mixing duct 125. The mixed air exits through a propulsion nozzle 130 disposed in the exhaust section 112, providing forward thrust. It will be appreciated that although a long cowl mixing duct installation is shown, any other configuration may alternatively be employed. For example, a co-annular nozzle could alternatively be used in which the air from the bypass duct 119 and air from the mixer nozzle 129 exit the engine 101 separately. In an embodiment, the turbines 128 rotate to thereby drive equipment in the engine 101, such as the compressor 118, via concentrically disposed shafts 132.

The cooling system 102 diverts a portion of the compressed, high temperature air from the compressor 118 and cools the diverted air before it is directed to other sections of the aircraft 100. In this regard, the cooling system 102 includes a heat exchanger 136 that is disposed between the bypass duct 119 and the engine nacelle 103. In an embodiment, the heat exchanger 136 is integrated into the engine 101 and includes a wall that is integrally formed with the outer wall 123 of the bypass duct 119. In another embodiment, the heat exchanger 136 may be a separate component that is coupled to the bypass duct outer wall 123 and positioned over the outer wall opening 124.

The heat exchanger 136 includes a bypass flow path air inlet 140, a bypass flow path air outlet 142, an engine air inlet 144, an engine air outlet 146, and a core 155. The bypass flow path air inlet 140 is in flow communication with the bypass flow path 120 and may also communicate with the engine nacelle opening 124. In another embodiment, a plurality of fins 150, which may or may not extend into the bypass flow path 120, are disposed in the bypass flow path air inlet 140 to encourage air from the bypass flow path 120 to flow into the heat exchanger 136. For example, one or more of the fins 150 may extend from the heat exchanger 136 and may include an angled flange 152 extending into the bypass flow path 120 configured to direct air toward the heat exchanger 136. Although seven fins are shown, it will be appreciated that a different number may alternatively be included. The bypass flow path air inlet 140 is also in flow communication with the bypass flow path air outlet 142 through a cold side of the heat exchanger core 155 via a duct (not shown).

The engine air inlet 144 is in flow communication with one or more sections of the engine 101 (e.g., compressor section 106) and receives compressed, high temperature air therefrom. In an embodiment, an engine air supply line 154 extends between the compressor section 106 and the engine air inlet 144 to thereby supply compressed, high temperature air to the heat exchanger 136. Although shown as a pipe, the engine air supply line 154 may alternatively be a duct or other structure suitable for delivering air to the heat exchanger 136. The engine air inlet 144 also communicates with the engine air outlet 146 through a hot side of the heat exchanger core 155 via a duct (not shown).

Cool air from the bypass flow path air inlet 140 enters the cold side of the heat exchanger and hot air from the engine air inlet 144 is directed into the hot side of the heat exchanger 136. The cold and hot air are separated from each other in the heat exchanger. In an embodiment, the heat exchanger core 155 may be made up of a plurality of fins that separate the air. The fins may promote exchange of heat from the hot air of the engine 101 to the relatively cold air of the bypass duct 119. The bypass duct air that has been used to cool the hot air is then exhausted overboard 167 via, for example, a duct 169. The cooled engine air may then be delivered to another aircraft system 164, such as an air conditioning system or an aircraft cabin via a bleed air supply line 156.

To regulate the air flow through the heat exchanger 136, one or more valves may be included in the cooling system 102. The valves may be any one of numerous types of valves capable of being disposed in a duct, or other suitable structure, and configured to selectively open and close to thereby regulate airflow and pressure therethrough. Additionally, the valves may be electrically, manually, pneumatically, or hydraulically operated.

In an embodiment, one or more bypass flow path valves (e.g., valve 162) may be disposed in the cooling system 102 downstream of the bypass flow path 120 to thereby regulate air flow from the bypass flow path 120 to the heat exchanger 136. For example, a valve (not shown) may be disposed between the bypass flow path 120 and the heat exchanger 136. The valve may be disposed in the bypass duct outer wall opening 124. Alternatively, the plurality of fins 150 may act as a valve and may be configured to actuate and selectively open and close to thereby regulate airflow through the bypass flow path air inlet 140. In another example, a valve 162 may be disposed downstream of the bypass air exhaust outlet 146, such as in duct 169.

In another embodiment, one or more engine flow path valves 166, 168, 170 may be used downstream of the engine 101 to regulate air flow from the engine 101 to the heat exchanger 136. For example, a valve 166 may be disposed between the engine 101 and the engine air inlet 144, and thus, may be disposed in the engine air supply line 154. In another example, a valve 168 may be disposed downstream of the heat exchanger 136. For instance, the valve 168 may be downstream of the engine air outlet 146 in the bleed air supply line 156. In another example, a valve 170 may be disposed downstream the bleed air supply line 156 proximate the aircraft system 164.

Thus, if the cooling system 102 is to be employed, one or more of the bypass flow path valves 162 and one or more of the engine flow path valves 166, 168, 170 are opened. If not these valves may be closed.

By including the cooling system 102 as part of the engine 100, and in some embodiments, integrally forming the cooling system 102 as part of the engine 100, air may flow directly therebetween. Consequently, a cooling system 102 has now been provided that is lighter than conventional cooling systems and that may be implemented into existing aircraft without substantially increasing weight. Moreover, the cooling systems may be implemented by adding a minimal number of additional components to the aircraft and may be simpler to install than conventional systems providing a cost savings.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A cooling system for an aircraft comprising:
an engine nacelle including an airflow inlet;
an engine housed in the engine nacelle in flow communication with the airflow inlet;
a bypass duct extending between the engine nacelle and the engine in flow communication with the airflow inlet, the bypass duct including an outer wall having an opening formed therein; and
a heat exchanger integrated with the engine and disposed outside of the bypass duct over the opening of the bypass duct outer wall between the bypass duct outer wall and the engine nacelle and having a wall that is integrally formed with the bypass duct outer wall, the heat exchanger includes a bypass flow path air inlet, an engine air inlet, a first outlet, and a second outlet, the bypass flow path air inlet providing flow communication between the bypass flow path and the first outlet, the engine air inlet providing flow communication between the engine and the second outlet.

2. The cooling system of claim 1, wherein:
the engine air inlet is configured to receive air and the bypass flow path air inlet is configured to receive air that has a temperature cooler than the air received by the engine air inlet; and
the heat exchanger is configured to allow energy exchange between the air received by the engine air inlet and the air received by the bypass flow path air inlet.

3. The cooling system of claim 2, further comprising a plurality of fins disposed in the bypass flow path air inlet.

4. The cooling system of claim 3, wherein one fin of the plurality of fins includes an angled flange configured to direct air toward the heat exchanger.

5. The cooling system of claim 3, wherein the plurality of fins is configured to selectively open and close to regulate airflow through the bypass flow path air inlet.

6. The cooling system of claim 1, further comprising a bypass flow path valve disposed downstream of the bypass flow path and configured to selectively open and close to regulate airflow through the heat exchanger.

7. The cooling system of claim 6, wherein the bypass flow path valve is disposed in the opening of the bypass duct outer wall.

8. The cooling system of claim 1, further comprising an engine flow path valve disposed downstream of the engine and configured to selectively open and close to regulate airflow through the heat exchanger.

9. The cooling system of claim 1, wherein at least a portion of the heat exchanger is integrally formed with the bypass duct outer wall.

10. A cooling system for an aircraft comprising:
an engine nacelle including an airflow inlet;
an engine housed in the engine nacelle in flow communication with the airflow inlet;
a bypass duct extending between the engine nacelle and the engine in flow communication with the airflow inlet, the bypass duct including an outer wall having an opening formed therein;
a heat exchanger disposed outside of the bypass duct between the bypass duct outer wall and the engine nacelle, the heat exchanger disposed on the bypass duct outer wall in communication with the opening thereof and including a bypass flow path air inlet, an engine air inlet, a first outlet, and a second outlet, the bypass flow path air inlet in flow communication with the bypass flow path and the first outlet, the engine air inlet in flow communication with the engine and the second outlet; and
a bypass flow path valve disposed downstream of the bypass flow path air inlet and configured to selectively open and close to at least partially regulate airflow through the heat exchanger.

11. The cooling system of claim 10, wherein the bypass flow path valve is disposed in the opening of the bypass duct outer wall.

12. The cooling system of claim 10, wherein a bypass flow path valve is disposed downstream of the heat exchanger first outlet.

13. The cooling system of claim 10, further comprising an engine flow path valve disposed downstream of the engine and configured to selectively open and close to regulate airflow through the heat exchanger.

14. A cooling system for an aircraft comprising:
an engine nacelle including an airflow inlet;
an engine housed in the engine nacelle in flow communication with the airflow inlet;

a bypass duct extending between the engine nacelle and the engine in flow communication with the airflow inlet, the bypass duct including an outer wall having an opening formed therein; and a heat exchanger disposed outside of the bypass duct between the bypass duct outer wall and the engine nacelle and having a wall that is integrally formed with the bypass duct outer wall, the heat exchanger in flow communication with the bypass duct outer wall opening and including a bypass flow path air inlet, an engine air inlet, a first outlet, and a second outlet, the bypass flow path air inlet providing flow communication between the bypass flow path and the first outlet, and the engine air inlet providing flow communication between the engine and the second outlet.

15. The cooling system of claim 14, further comprising an engine flow path valve disposed downstream of the engine and configured to selectively open and close to regulate airflow through the heat exchanger.

16. The cooling system of claim 15, wherein the engine flow path valve is disposed between the engine and the heat exchanger engine air inlet.

17. The cooling system of claim 15, wherein an engine flow path valve is disposed downstream of the heat exchanger second outlet.

18. The cooling system of claim 14, further comprising a bypass flow path valve disposed downstream of the bypass flow path air inlet and configured to selectively open and close to regulate airflow through the heat exchanger.

19. The cooling system of claim 18, wherein the bypass flow path valve is disposed in the opening of the bypass duct outer wall.

20. The cooling system of claim 14, wherein a bypass flow path valve is disposed downstream of the heat exchanger first outlet.

* * * * *